(12) United States Patent
Boston

(10) Patent No.: US 6,840,518 B2
(45) Date of Patent: Jan. 11, 2005

(54) DEFORMABLE BRUSH SEAL SUPPORT

(75) Inventor: Ian William Boston, Derby (GB)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 10/283,845

(22) Filed: Oct. 30, 2002

(65) Prior Publication Data

US 2003/0085525 A1 May 8, 2003

(30) Foreign Application Priority Data

Nov. 1, 2001 (GB) .............................. 0126220

(51) Int. Cl.$^7$ ......................................... F16J 15/447
(52) U.S. Cl. ..................................... 277/355; 277/411
(58) Field of Search .................................. 277/355, 411

(56) References Cited

U.S. PATENT DOCUMENTS

| 5,308,088 | A |   | 5/1994  | Atkinson et al. |
| 5,496,045 | A | * | 3/1996  | Millener et al. ............. 277/355 |
| 6,105,966 | A |   | 8/2000  | Turnquist et al. |
| 6,139,018 | A |   | 10/2000 | Cromer et al. |
| 6,173,962 | B1 | * | 1/2001  | Morrison et al. ............ 277/355 |
| 6,254,344 | B1 |   | 7/2001  | Wright et al. |
| 6,308,957 | B1 | * | 10/2001 | Wright ........................ 277/355 |
| 6,457,719 | B1 | * | 10/2002 | Fellenstein et al. .......... 277/355 |
| 6,601,853 | B2 | * | 8/2003  | Inoue ........................... 277/355 |
| 2002/0140175 | A1 |   | 10/2002 | Kono |

FOREIGN PATENT DOCUMENTS

| EP | 0 453 315 A1 | 4/1991 |
| EP | 0 979 963 A2 | 2/2000 |

* cited by examiner

Primary Examiner—Alison Pickard
Assistant Examiner—Enoch Peavey
(74) Attorney, Agent, or Firm—Kirschstein et al.

(57) ABSTRACT

A brush seal is provided for sealing between a rotating shaft and a housing. The brush seal includes an annular rim or head portion coaxial with the shaft and mounted on the housing, an annular array of bristles extending from the head portion toward the shaft for contact with the shaft at their ends, and an annular bristle support plate extending from the head portion toward the shaft. The support includes voids arranged to accommodate radial deformation in the support due to rubbing contact between the support and the shaft without incurring any substantial accompanying axial deformation which would distort the bristles and cause deterioration of their sealing function.

5 Claims, 3 Drawing Sheets

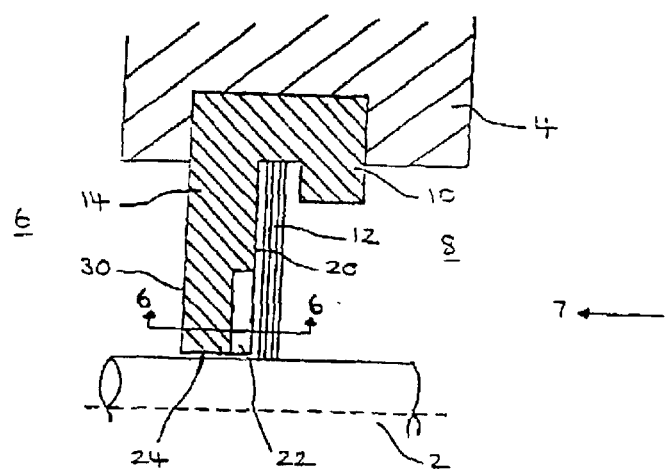
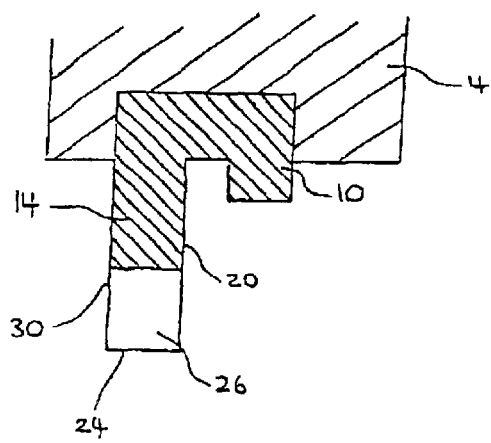 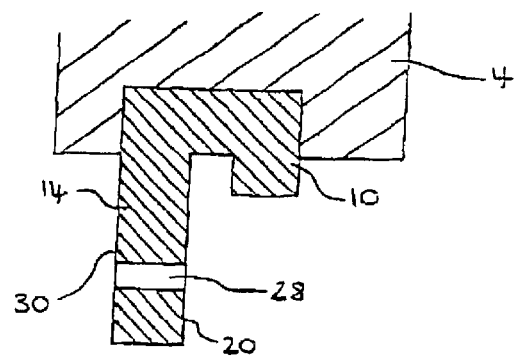

DEFORMABLE BRUSH SEAL SUPPORT

BACKGROUND OF THE INVENTION

1. Field of the Invention

The present invention relates to brush seals for dynamic shaft sealing, and in particular to brush seals having a deformable rear support.

2. Description of the Related Art

The background art will now be explained with reference to FIGS. 1 and 2. Brush seals are a common way of providing a seal to control leakage between a rotating shaft 2 and housing 4. They are typically found in gas turbine engines and the like, where they seal between a low-pressure region 6 of the engine and a high-pressure region 8. Brush seals usually include an annular rim or head portion 10 that is mounted on the housing 4 in such a way as to be coaxial with the shaft 2. The head portion 10 is usually formed from a high-grade stainless steel. A large number of bristles 12 extend from the head portion 10 towards the shaft 2 such that the ends of the bristles wipe against the surface of the shaft. The bristles 12 may comprise steels, nickel-based alloys or ceramics and may be welded into or clamped in the head portion 10, as appropriate. Individual bristles are relatively flexible, but collectively impede fluid leakage therepast. However, because of the pressure difference between the low-pressure and high-pressure regions of the engine, the bristles 12 have a tendency to bend towards the low-pressure side 6 of the brush seal. If the bristles 12 bend then the ends of some or all of the bristles may not continue to wipe against the surface of the shaft 2 and the leakage past the seal is no longer adequately controlled.

To stop the bristles 12 from bending towards the low-pressure side 6, the brush seal includes a rigid annular side support or backing plate 14. The support 14 extends from the head portion 10 towards the shaft 2 adjacent the bristles 12 on the low-pressure side 6 of the brush seal. Ideally the clearance between the support 14 and the surface of the shaft 2 should be as small as possible. However, if the shaft 2 is subject to excessive radial movement in the vicinity of the brush seal then the bristles will be deflected and the shaft may come into repeated contact with the support 14. This small clearance is not necessarily a disadvantage because it minimizes fluid leakage between the support 14 and the shaft 2. However, repeated rubbing contact increases the radial clearance between the support 14 and the shaft 2 due to deformation of the support. The support is thicker in the radial direction than in the axial direction and is therefore very resistant to deformation under compressive stress in the radially outward direction. Consequently, to accommodate radial deformation, the radially inner part of the support 14 plastically deforms by spreading out in the axial direction. FIG. 2 shows a rear support 14 that has been radially and axially deformed by repeated rubbing contact with the shaft 2. The axial deformation of the radially inner part 16 of the support 14 causes the bristles 12 to bend towards the high-pressure side 8 of the brush seal. This allows a gap 18 to open up between the ends of the bristles 12 and the surface of the shaft 2 which, together with the increased radial clearance between the shaft 2 and the support 14, reduces the sealing efficiency.

One way of preventing material in the base of the support from being axially deformed is to use a sacrificial rear support. A brush seal incorporating a sacrificial support is disclosed in EP-0453315-A1 (Cross Manufacturing Company Limited). In this case the base of the support is formed from an abradable material having a typical composition of 85% nickel and 15% graphite. The support is finished to define an inner diameter very slightly larger than the diameter of the shaft. If during operation of the brush seal the shaft contacts the base of the support then the abradable material will wear away instead of being axially displaced. This means that the bristles will not be displaced sideways by axial spreading of the support and the sealing efficiency will be maintained.

The present invention aims to provide an alternative solution to the problem that does not require the use of a sacrificial rear support.

SUMMARY OF THE INVENTION

The present invention provides a brush seal for sealing between a rotating shaft and a housing, the brush seal comprising an annular head portion coaxial with the shaft and mounted on the housing, an annular array of bristles extending from the head portion toward the shaft for contact therewith at their end portions, and an annular support extending from the head portion toward the shaft and providing the array of bristles with support against axial deflection due to pressure differences across the seal, wherein the support includes a plurality of angularly spaced apart voids having radial and axial dimensions sufficient to allow the support to plastically deform preferentially in the radial direction by at least partial occlusion of the voids, and without significant plastic deformation in the axial direction, when there is rubbing contact between the support and the shaft.

The present invention is not designed to eliminate contact between the support and the shaft because it is desired to maintain an absolute minimum clearance between the support and the shaft as far as possible. The above-mentioned voids in the support enable radial plastic deformation of the support to occur preferentially, so allowing the support to shorten in the radial direction without any significant axial deformation. The voids are therefore at least partially filled by deformed material as the repeated contact between the support and the shaft effectively pushes the support in the radial direction. Substantial elimination of axial deformation of the support ensures that the seal between the bristles and the shaft is maintained and improves the cycle efficiency of the engine.

The voids may be channels which are preferably formed in the annular surface of the support adjacent the bristles (i.e., the annular surface facing the high-pressure side of the brush seal). However, it will be readily appreciated that the channels may, perhaps less desirably, also be formed in the annular surface of the support facing the low-pressure side of the brush seal.

The channels are preferably radial and extend from the radially inner surface of the support toward the head portion.

Alternatively, the voids may be slots extending outwards from the radially inner surface of the support and extending between the two annular surfaces of the support.

In a further alternative embodiment, the voids may be axially extending holes that preferably extend between the two axially opposed annular faces of the support. Such holes may be radially and/or circumferentially extended relative to their other cross-sectional dimension to form slot-shaped holes.

The sizes of the voids should be sufficient to receive all the material in the support that is radially displaced because of contact between the support and the shaft. However, the voids should not be so large as to significantly weaken the structural integrity of the support.

The shapes of the voids may be determined with reference to the heat dissipation characteristics of the support, to prevent damage to the bristles caused by a build up of heat from rubbing contact between the support and the shaft.

If the void is a radial channel or slot then the plurality of bristles are preferably angled in the circumferential direction with respect to a normal radius of the shaft, such that the bristles lie transversely of a major dimension of each void as manifested on a surface of the support. This prevents the channel or slot from interfering with the movement of the bristles. It also prevents the bristles from being received within the channel or slot where they could bend towards the low-pressure side of the brush seal.

Additional objects, advantages and novel features of the present invention will become apparent to those skilled in the art from this disclosure, including the following detailed description as well as by practice of the invention.

BRIEF DESCRIPTION OF THE DRAWINGS

FIG. 3 is a radial cross-sectional view of a brush seal according to the present invention;

FIG. 4 is a radial cross-sectional view of a first alternative embodiment of the invention;

FIG. 5 is a radial cross-sectional view of a second alternative embodiment of the invention;

DETAILED DESCRIPTION OF EMBODIMENTS OF THE INVENTION

Figure 1:
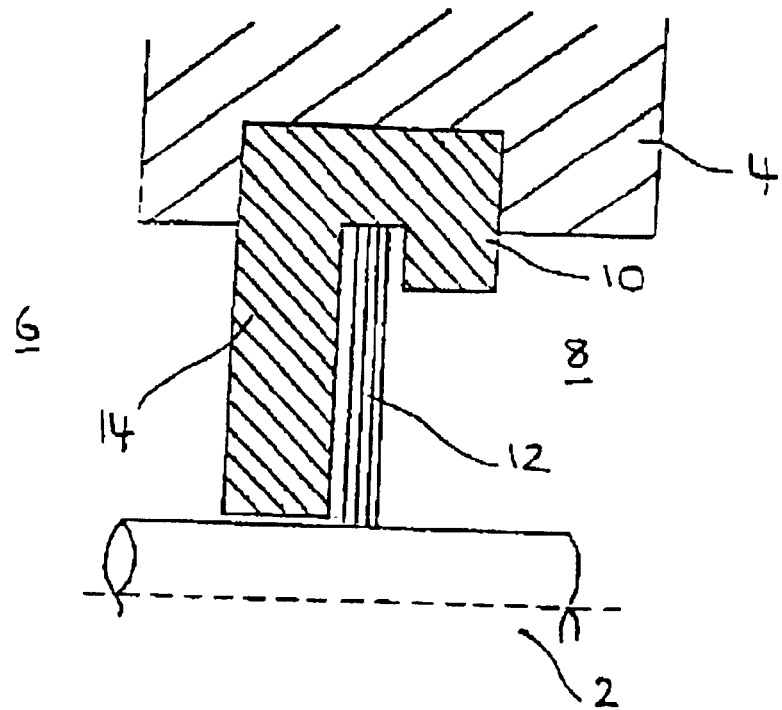
FIG. 1 is a radial cross-sectional view of a conventional brush seal according to the prior art.
Figure 2:
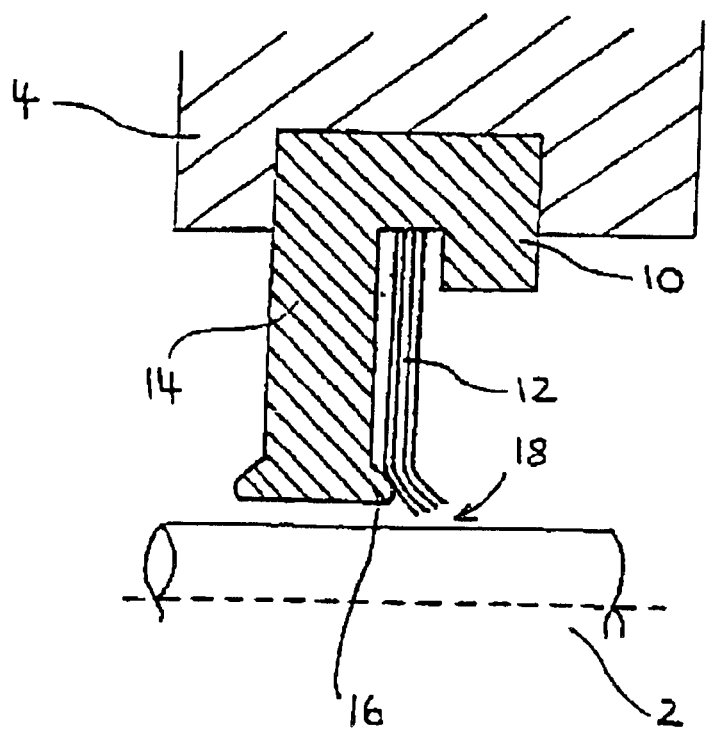
FIG. 2 is a radial cross-sectional view of the conventional brush seal of FIG. 1 after the support has been in regular rubbing contact with the shaft according to the prior art.

The present invention will now be explained with reference to FIGS. 3 to 7. The brush seal of FIG. 3 is similar to that of FIG. 1, and like parts have been given the same reference numerals.

Figure 6:
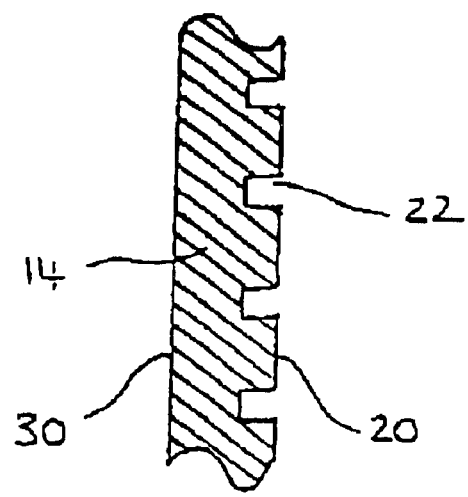
FIG. 6 is a cross-sectional view taken along a cylindrical surface shown by line 6—6 of FIG. 3.
Figure 7:
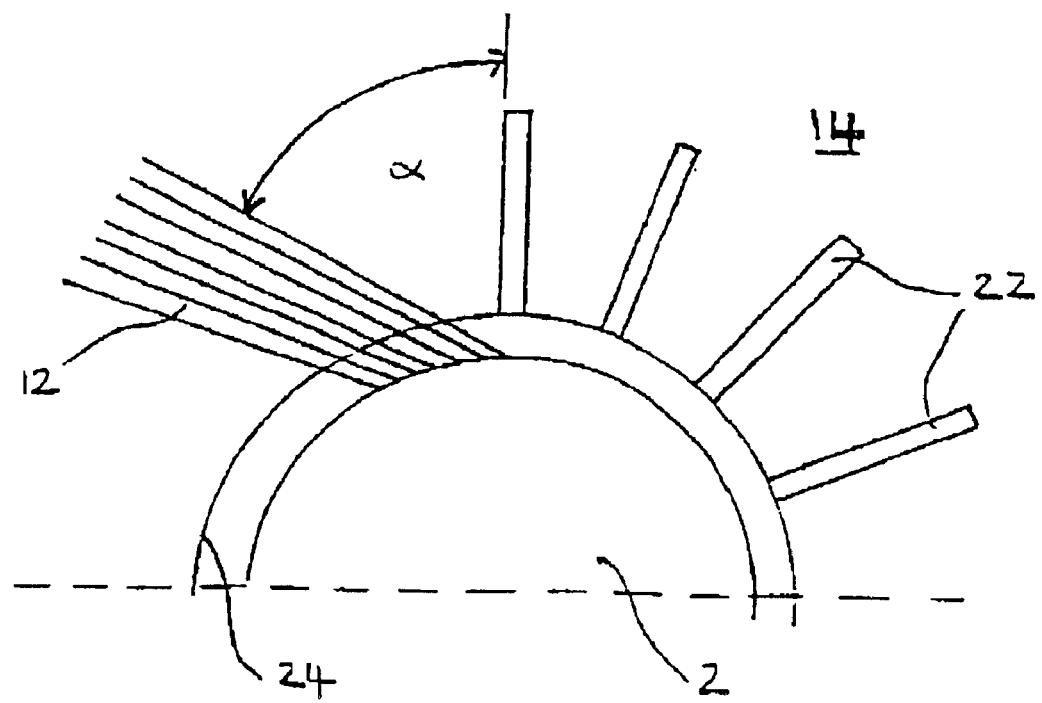
FIG. 7 is an end view taken along arrow 7 of FIG. 3.

In FIG. 3 the rear support 14 has an annular surface 20 adjacent the plurality of bristles 12. The support 14 includes an annular array of voids in the form channels 22 in the annular surface 20. These channels 22 extend radially from the radially inner surface 24 of the support 14 towards the head portion 10. The channels 22 are spaced circumferentially around the radially inner surface 24 of the support 14, as shown in FIGS. 6 and 7.

Alternative ways of implementing the voids in the supports are shown in FIGS. 4 and 5. In FIG. 4 a plurality of slots 26 extend radially from the support's radially inner surface 24 towards the head portion 10 and also extend radially from one annular surface 20 of the support 14 to the other annular surface 30. In FIG. 5 the support 14 includes a plurality of holes 28 that extend axially between the annular surface 20 adjacent the bristles 12 and the annular surface 30 facing the low-pressure side 6 of the brush seal.

Although the channels 22 are shown as being rectangular as seen in side elevation and are oriented exactly radially, it will be readily appreciated that they can be of any suitable shape and orientation—for example, instead of extending exactly radially, they could extend at an angle which is skewed away from the radial direction, or they could even assume a somewhat spiral form, in which the skew angle increases with radial distance from the support's inner surface 24.

Similarly, slots 26 could also extend outwards at an angle which is skewed away from the radial direction. In an additional variation, instead of extending exactly axially between the annular faces of the support, slots 26 could extend in a direction which is circumferentially skewed with respect to the axial direction.

Furthermore, it would probably be desirable to avoid stress-raising features such as sharp corners and to this end the internal corners of any channel or slot would be radiused.

At the option of the designer, holes 28 could be circular or non-circular in cross-section and need not extend exactly axially. For example, they could be circumferentially or radially skewed away from the axial direction and/or could be radially or circumferentially extended relative to their other cross-sectional dimension to form slot-shaped holes. Unlike the slots of FIG. 4, such holes 28 would not open out onto the radially inner surface 24 of the support 14.

A single support 14 may include channels 22 and/or slots 26 and/or holes 28.

The channels 22, slots 26 and holes 28 are sized and circumferentially spaced apart in such a way as to accommodate radial deformation of the support 14 caused by repeated contact between the support 14 and the shaft 2. During operation of the brush seal the channels 22, slots 26 or holes 28 are at least partially filled by adjacent material in the support 14 and the width of the radially inner part of the support 14 remains substantially unchanged. The adjacent material is pushed into the channels 22, slots 26 or holes 28 as the support 14 shortens in the radial direction. Without the channels 22, slots 26 or holes 28, the radially inner part of the support 14 would be forced to spread out or deform in the axial direction.

Size and spacing of the voids necessary to achieve the objects of the invention will differ according to the type of void, the materials used, the duty performed by the engine and the dimensions of the shaft and housing, etc., but are readily ascertainable by routine experimentation.

FIG. 7 shows how the bristles 12 are angled in the circumferential direction with respect to a normal radius of the shaft 2. The angle α is called the phase angle and improves the efficiency of the sealing, as known. The phase angle also means that the bristles 12 do not lie parallel with the channels 22 or slots 26; instead the bristles lie transversely of a major dimension of each void as manifested on the annular surface of the support adjacent the bristles. This is important because it prevents the channels 22 and slots 26 from interfering with the movement of the bristles 12. It also stops the bristles 12 from being received within the channels 22 or slots 26, where they could bend towards the low-pressure side 6 of the brush seal.

It will be understood that each of the elements described above, or two or more together, also may find a useful application in other types of constructions differing from the types described above.

While the invention has been illustrated and described as embodied in a deformable brush seal support, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A brush seal for sealing between a rotating shaft and a housing, the brush seal comprising:
   a) an annular head portion coaxial with the shaft and mounted on the housing;
   b) an annular array of bristles extending from the head portion toward the shaft for contact therewith at their end portions; and
   c) a rigid annular support having axially opposed annular surfaces and extending from the head portion toward the shaft and providing the array of bristles with support against axial deflection due to pressure differences across the seal, wherein the support includes a plurality of angularly spaced apart slots that extend outwards from a radially innermost surface of the support toward the head portion, the slots having radial and axial dimensions sufficient to allow the support to plastically deform in a radial direction by at least partial occlusion of the slots, and without significant plastic deformation in an axial direction, when there is rubbing contact between the support and the shaft.

2. The brush seal according to claim 1, in which the slots extend between the axially opposed annular surfaces of the support.

3. The brush seal according to claim 1, in which the slots comprise channels formed in one of the axially opposed annular surfaces of the support.

4. The brush seal according to claim 1, in which the slots are radially oriented.

5. The brush seal according to claim 1, in which the bristles are angled in the circumferential direction with respect to a normal radius of the shaft, such that the bristles lie transversely of a major dimension of each slot.

* * * * *